April 28, 1931. A. LEO 1,802,951
JELLY CUTTING TOOL
Filed Sept. 4, 1928 3 Sheets-Sheet 1
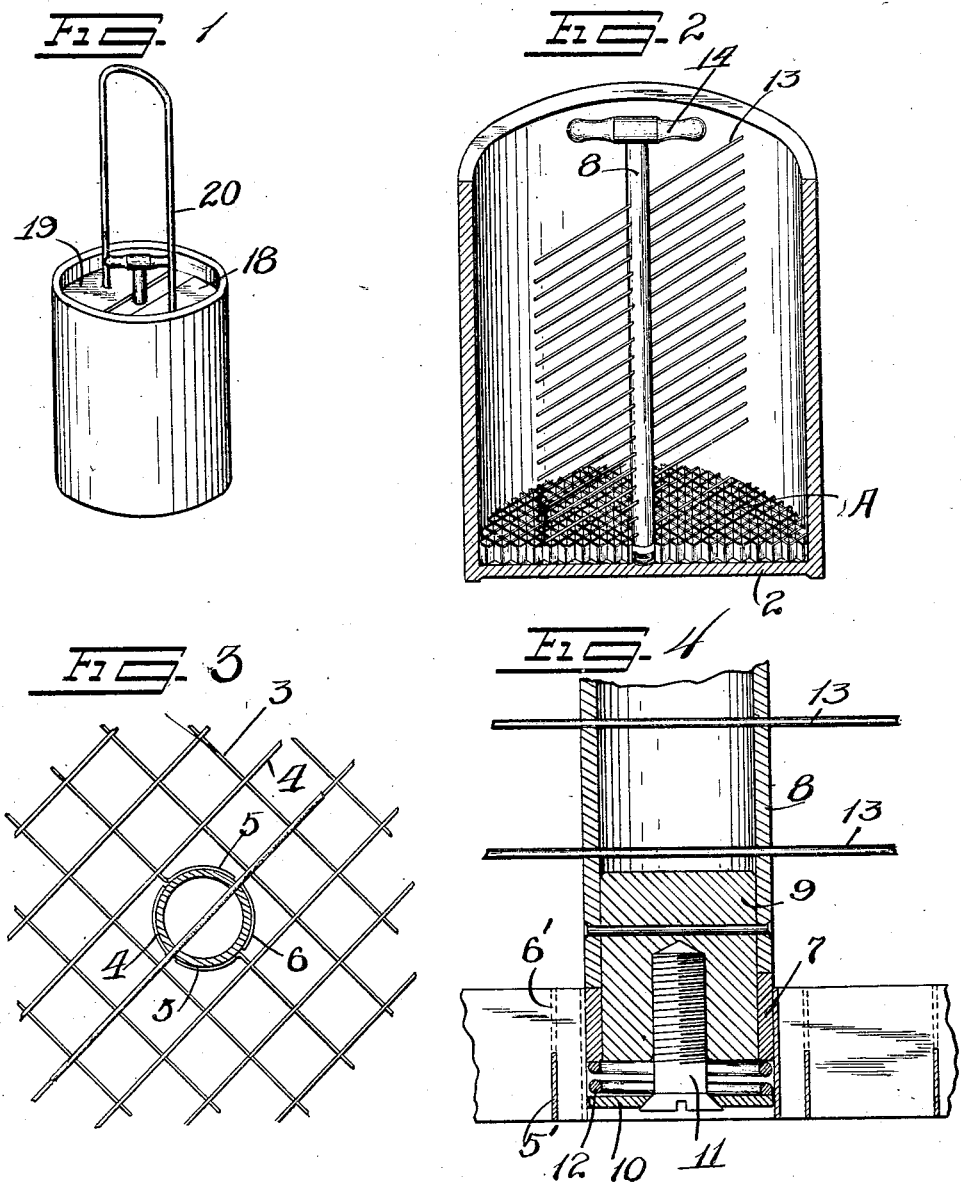
Inventor
Albert Leo
by Charles F. Wills
Attys

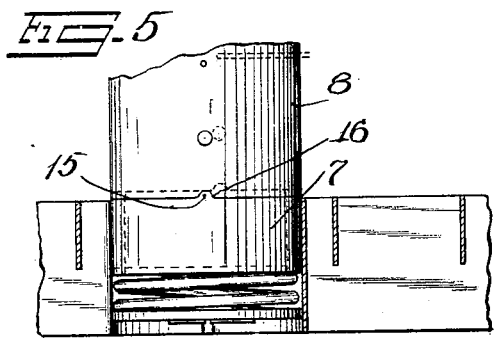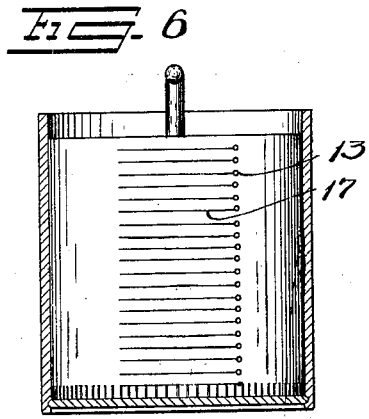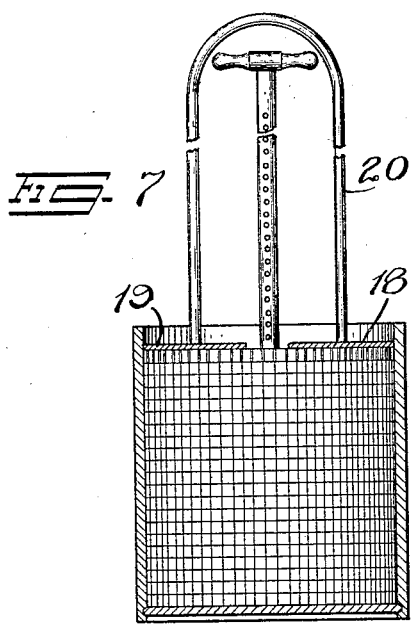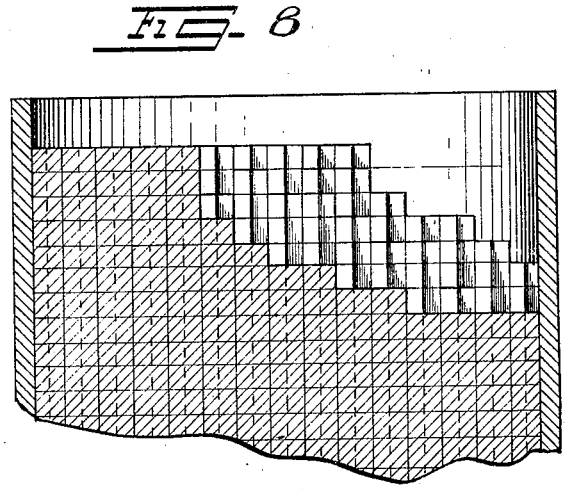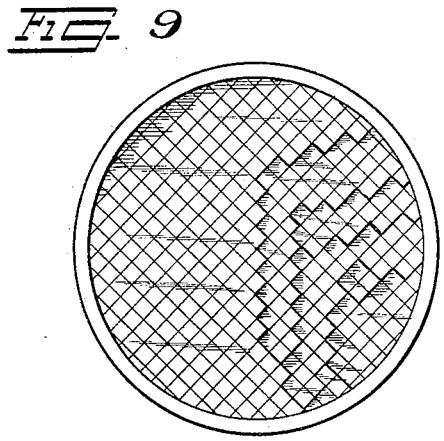

April 28, 1931.  A. LEO  1,802,951
JELLY CUTTING TOOL
Filed Sept. 4, 1928  3 Sheets-Sheet 3
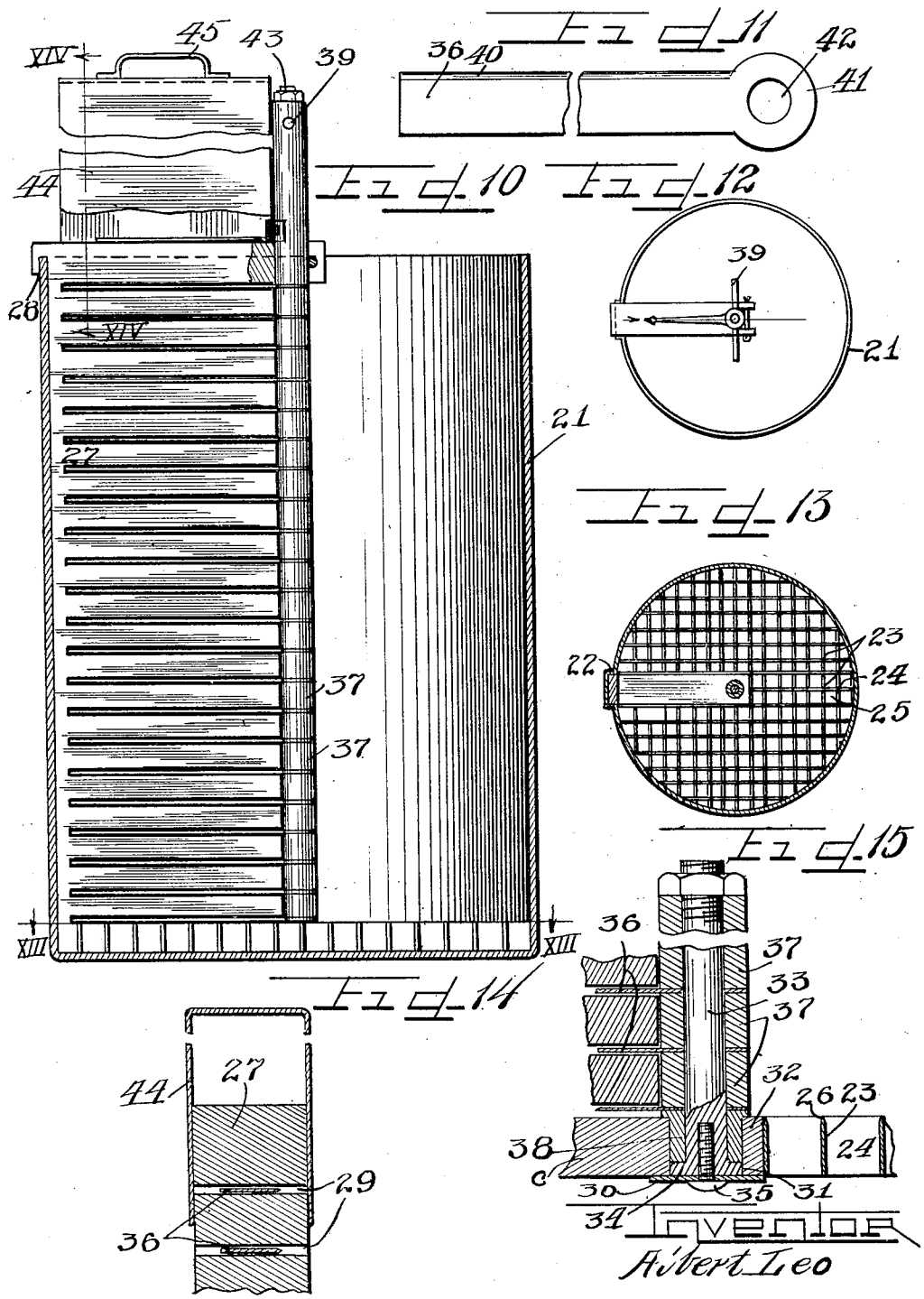

Patented Apr. 28, 1931

1,802,951

UNITED STATES PATENT OFFICE

ALBERT LEO, OF CHICAGO, ILLINOIS

JELLY-CUTTING TOOL

Application filed September 4, 1928. Serial No. 303,624.

This invention relates to a dicer or tool for cutting a pail full of jelly into cubes or other shapes, without removing the jelly from the pail or other original container.

An object of the invention is to provide a tool for dicing a container full of jelly without removing the jelly from its container.

Another object of the invention is to provide a jelly dicer which is economical to manufacture and efficient in use.

The above, other and further objects of the invention will be apparent from the following description, accompanying drawings and appended claims.

According to the invention means are provided for cutting the jelly in its original container into a plurality of vertical strips by moving the means axially through the container, together with other means for cutting the jelly into a plurality of horizontal slices, so that the finished pieces will be cleanly cut and of uniform shape.

One form of the invention is illustrated in the accompanying drawings and the views thereof are as follows:

Figure 1 is a perspective view of a jelly pail or like container, showing a jelly cutting tool therein embodying the invention.

Figure 2 is an enlarged perspective vertical section through a jelly container, showing a cutting device in the container.

Figure 3 is a fragmental top plan view, partially in section, of the base member for making the vertical cuts in the jelly.

Figure 4 is an enlarged fragmental vertical section through the lower end of one form of spindle, showing its association with the base.

Figure 5 is a fragmental side elevation of the lower end of a spindle associated with the base member, showing a stop for limiting angular movement of the spindle.

Figure 6 is a vertical section through a container showing a mass of jelly, a portion of which has been partially horizontally sliced.

Figure 7 is a vertical sectional view through a jelly container, showing the appearance of the contents thereof when the same has been completely diced or cut in accordance with the device of my invention.

Figure 8 is an enlarged fragmental sectional view of a portion of a jelly container which has been completely diced, showing certain of the pieces removed.

Figure 9 is a top plan view of Figure 8.

Figure 10 is a partial sectional and elevational view of a jelly pail with a jelly cutter of modified form in the pail.

Figure 11 is a fragmental top plan of one of the cutter knives used with the modification of Figure 10.

Figure 12 is a top plan view of the cutter of Figure 10.

Figure 13 is a section on line XIII of Figure 10.

Figure 14 is a fragmental enlarged section on line XIV of Figure 10.

Figure 15 is a fragmental vertical sectional view of the spindle and associated parts showing one means for fastening said parts together.

The accompanying drawings illustrate the cutting device in connection with a jelly container such as a pail, which pail includes a side 1 and a bottom 2.

The device illustrated in Figures 1 thru 9 comprises a base A shaped to fit within the pail and to engage against the inner surface of the wall 1 of the pail.

The base comprises a plurality of thin cross members 3 and 4 arranged at right angles, which members have slots 5' extending partway of the heights of the members for cooperating with similarly shaped but oppositely arranged slots 6' in the cross members. The base so constructed may be termed a grill, with the members arranged to provide a plurality of spaces of uniform shape, the spaces in the present instance being shown as square in plan view, although any other shape may be made as desired.

The inner ends 5 of certain of the members 3 and the inner ends 6 of certain of the members 4 are arcuate and are secured by welding or otherwise to a sleeve 7.

A spindle 8 having a plug 9 in the lower end thereof receives the sleeve 7 with the plug 9 entering the sleeve 7. A plate 10 is movable within the circular space defined by the ends 5 and 6 of the cross members 3 and 4 respectively and is attached to the plug 9 by a bolt 11. A spring 12 is interposed between the plate 10 and the lower end of the plug 9. The outer surface of the spindle 8 and the sleeve 7 lie in the same cylindrical surface.

The spindle 8 is provided with vertically spaced horizontally disposed cutters, such as wires 13, arranged in the same vertical plane and which extend on each side of the spindle. The length of the wires 13 is that of the inner diameter of the pail.

A handle 14 is attached to the upper end of the spindle 8 for the purpose of turning the spindle when inserted in the pail and also for bodily moving the device.

The sleeve 7 has a lug 15 formed on its upper surface and the spindle 8 has a projection 16 arranged to abut the lug 15 under certain circumstances.

Commercial jelly is sold or made usually in pails or like containers, containing about thirty pounds of jelly, so that the cutting device of my invention is made to conform to the pails in which the jelly is sold or made.

There are two ways of cutting the contents of a jelly container with my device, without removing the jelly from the container.

The first way is to insert the device in the pail as shown in Figure 2 before the jelly liquid is poured into the pail. In such event the device is placed in the pail and the jelly liquid poured into the pail and allowed to set until hard enough to cut.

The jelly in such instance is cut into cubes or pieces of other shape by the operator grasping the handle 14 and turning the spindle 8, thereby swinging the cutting wires about the spindle as an axis, thus making a plurality of horizontal cuts or slices 17. Figure 6 shows such slices 17 made by a quarter turn of the handle, with the ends of the cutters 13 exposed.

The handle 14 is turned far enough so that the cutters 13 will completely slice the jelly within the pail, whereupon the device is then lifted from the pail so that the base A will then cut the horizontal slices, vertically dividing the finished cubes or pieces as shown in Figures 7, 8 and 9 of the drawings.

To prevent the cutters 13 from being out of register with the cross members 3 and 4 when the device is withdrawn from the pail just described, the handle 14 is turned until the projection 16 on the spindle 8 engages the lug 15 on the sleeve 7. The lug 15 and the projection 16 are so arranged as to engage when the plane of the cutter wires 13 is in the same vertical plane as one of the two cross members 3 or 4 which pass through the axis of the spindle 8 as shown in Figure 3. When the spindle has been turned to this position, the device may be withdrawn without the cutter wires 13 marring the sides of the pieces cut and to assure that the cut made by the wires 13 when withdrawn will be coincident with a cut to be made by one of the cross members 3 or 4 of the base A.

The second use of the device in cutting jelly in its original container may be accomplished by applying the device to a container full of jelly and pushing the base A down until it rests on the bottom of the pail 2, whereupon said base will cut the jelly with a plurality of vertical cuts into vertical strips of the outline defined by the cross members 3 and 4 of the base A. The handle 14 is then turned so that the cutter wires 13 will slice the jelly horizontally, thus completing the cutting of the jelly into the cubes or other shaped pieces as shown in Figures 7, 8 and 9. The cutting device remains in the pail until the contents thereof has been removed.

It will be observed that my invention cuts jelly in its original container without having to remove the jelly from the container, so that the pieces may be removed as desired for use.

I have found that in cutting hard jelly, especially when the cutting tool is inserted in the pail before the jelly is added, that some means must be provided to hold down the jelly while withdrawing the cutting tool. Such an arrangement is shown in Figures 1 and 7 of the drawings and consists of two substantially semi-circular pieces 18 and 19 carried at the end of an inverted U-shaped handle 20 so that the pieces 18 and 19 may be placed on top of the jelly in the container as shown in Figure 7 to hold down the jelly as the tool is lifted, so that the base A will cut the jelly vertically. Such an arrangement is shown clearly in Figure 7.

The height of the cross members 3 and 4 may be any as desired, but I prefer to make the height equal to the distance between two adjacent cutter wires 13 and 14 so that the bottom layer of cubes which is cut by the lowermost cutter wires 13 will be the same height as the cubes cut by the other cutter wires.

The modification shown in Figures 10 to 15 is arranged to be inserted in a special pail before the jelly liquid is poured into the pail. The pail 21 is made with an offset 22 extending vertically from the bottom to top.

The base C comprises a plurality of strips 23 and 24 which are arranged edgewise and intersect forming a plurality of spaces 25. The spaces are shown as square but of course may be made of any other desired shape by suitable arrangement of the intersecting cutter strips 23 and 24.

The top edges of the intersecting cutters 23 and 24 may be sharpened at 26 if desired. The plate 27 having a hook 28 in its upper end for engaging over the top of the offset 22 of the pail is secured to the base C. The plate has a plurality of horizontal slots 29 extending from side to side of the plate but terminating short of the outside edge of said plate, as may be observed in Figure 10.

The plate is secured to the base C by a disc 30 which overlies an aperture 31 in an extension 32 of the plate at the center of the base C. A spindle 33 having an enlarged head 34 is inserted in the aperture 31 of the plate, and a bolt 35 passing through the disc 30 is threaded into the spindle 33 to hold the spindle and plate connected to the base C.

A plurality of cutters 36 are carried by the spindle 33 in horizontally spaced relation by means of collars 37 disposed as shown in the drawings. The bottommost collar 38 has a reduced end for entering the recess 31 in the plate forming a bearing for the lower end of the spindle and firmly connecting the spindle and plate.

The distance between the cutters 36 is made to correspond to the heights of the cubes or dice of jelly to be cut by this device. There are as many cutters 36 as the height of the pail 21 will accommodate in accordance with the desired heights of the cubes to be so cut.

The spindle 37 is extended upwardly above the top of the pail and is provided with a handle 39 for turning the spindle to slice the jelly horizontally by the cutters 36 as well as withdraw the device from the pail, thus cutting the contents into a plurality of vertical strips conforming to the shapes defined by the intersecting cutters 23 and 24 of the base C.

The cutters 36 are shown as having one edge sharpened as at 40. It is, of course, within the scope of my invention to sharpen both edges if so desired. The cutter 36 has an enlarged end 41 provided with a circular opening 42 for the spindle 33. A nut 43 retains the spacers 37 and cutters 36 on the spindle 33.

Figure 14 shows the width of the plate 27 as greater than the width of the cutters 36. This arrangement, of course, is susceptible of modification.

The device of Figures 10 to 15 is inserted in the pail 21 prior to the time the jelly liquid is put in the pail. When the jelly has set sufficiently to be cut the handle 39 is actuated to turn the cutters 36 through 360 degrees from the position shown in Figure 10 back to the same position, that is, with the cutters 36 included in the slots 29 of the plate 27. Such operation slices the jelly into a plurality of horizontal discs, the thickness of which is the distance between the cutters 36.

A cover 44 of thin metal having a handle 45 is then applied over the plate 27 to close the slots 29 therein and provide a smooth surface on each side of the plate, so that when the device is withdrawn from the pail to cut the jelly vertically by means of the intersecting cutters 23 and 24 of the base C the edges of the jelly adjacent the plate 27 will not be scarred.

While I have described more or less precisely the details of construction of my invention, yet I do not wish to be understood as limiting myself thereto, as I am aware that changes may be made in the arrangement and proportion of parts and that equivalents may be substituted, all without departing from the spirit and scope of my invention.

I claim as my invention:

1. A jelly dicer arranged for insertion in a jelly container and having means to cut the jelly in a plurality of vertical strips and other means for cutting said jelly in a plurality of horizontal slices, a single instrumentality for actuating both of said means in the manner stated, said dicer being operable to so cut the jelly in its container without removing the jelly or the dicer from the container.

2. A jelly dicer arranged to be inserted in a jelly container for dicing the jelly without removing it from its container comprising means for making a plurality of vertical cuts as said dicer is moved axially through said container, and other means operable within the compass of the container for cutting a plurality of horizontal slices in the jelly while said first means is at rest in said container, and a single instrumentality for actuating both the means for making a plurality of vertical cuts and for making a plurality of horizontal slices.

3. A jelly dicer arranged to be inserted in a jelly container for dicing the jelly without removing it from its container comprising a base member consisting of a grill of cross members defining a plurality of uniformly shaped spaces for cutting the jelly vertically into a plurality of strips of like shape by being bodily moved axially through the jelly while in said container, means associated therewith and operable within the compass of the container for cutting said jelly while in said container in a plurality of horizontal slices, and a single member secured to said base for moving said base to cut the vertical strips and also operatively associated with said means for effecting the horizontal cuts whereby actuation of said single member will make both horizontal and vertical cuts.

4. A jelly dicer arranged to be inserted in a jelly container for dicing the jelly without removing it from its container comprising a member rotatable within said container and operable within the compass of the container for cutting the jelly into a plurality of horizontal slices, and another member connected to and carried by said first member for vertically cutting said jelly into a plurality of uniformly shaped strips as said device is moved axially through the container.

5. A jelly cutter comprising a base formed of flat cross members arranged edgewise defining a plurality of spaces of uniform outline, a spindle pivotally connected to said base, a plurality of horizontally spaced cutters carried by said spindle, and a handle for operating said spindle.

6. A jelly cutter comprising a base member formed of flat cross members arranged edgewise defining a plurality of spaces of uniform outline, a spindle pivotally connected to said base, a plurality of horizontally spaced cutters carried by said spindle, and means for stopping rotation of said spindle when the plane of the cutters thereon is in alignment with the plane of one of the base cross members which includes the axis of said spindle.

7. A jelly cutter comprising a base formed of cross members defining a plurality of spaces and arranged to be moved bodily through a mass of jelly cutting the same vertically into a plurality of strips, a spindle pivoted on said base carrying a plurality of vertically spaced horizontal cutters arranged to cut said jelly in a plurality of horizontal strips on rotation of said spindle, and a handle for rotating said spindle and moving said base through the jelly.

8. A jelly dicer having a base of crossed vertically arranged cutters defining a plurality of spaces, said base being of such size and contour as to enter a jelly container, and a spindle carrying a plurality of vertically spaced horizontal cutters for cutting said jelly into a plurality of horizontal slices pivotally associated with said base.

9. A jelly cutting device insertible in a jelly container comprising a base of intersecting cutters defining a plurality of spaces, a spindle connected to said base and supporting a plurality of horizontally spaced radially extending cutters, and a handle for rotating said spindle and moving said device bodily through the jelly.

10. A jelly cutting device insertible in a jelly container comprising a base of intersecting cutters defining a plurality of spaces for cutting the jelly vertically into a plurality of strips of same shape as said spaces, and a plurality of horizontally disposed vertically spaced cutters on said device, and means for moving said cutter to cut the jelly horizontally.

11. A jelly cutting device insertible in a jelly container comprising a base of intersecting cutters defining a plurality of spaces, a spindle connected to said base and supporting a plurality of horizontally spaced radially extending cutters, and a plate connected to said base having a plurality of slots for receiving said cutters.

12. A jelly cutting device insertible in a jelly container comprising a base of intersecting cutters defining a plurality of spaces, a spindle connected to said base and supporting a plurality of horizontally spaced radially extending cutters, a plate connected to said base having a plurality of slots for receiving said cutters, and a cover slidable over said plate and said included cutters to permit withdrawal of said device from the jelly without scarring the surface of the jelly adjacent said plate.

In testimony whereof I have hereunto subscribed my name at Chicago, Cook County, Illinois.

ALBERT LEO.